United States Patent [19]
Pungs

[11] Patent Number: 5,194,086
[45] Date of Patent: Mar. 16, 1993

[54] PROCESS FOR THE RECOVERY OF VALUABLE MATERIALS FROM SLAGS OF METALLOTHERMIC PROCESSES

[75] Inventor: Hartmut Pungs, Laufenburg, Fed. Rep. of Germany

[73] Assignee: Hermann C. Starck GmbH & Co. KG, Berlin, Fed. Rep. of Germany

[21] Appl. No.: 886,681

[22] Filed: May 20, 1992

[30] Foreign Application Priority Data

May 24, 1991 [DE] Fed. Rep. of Germany ....... 4116949

[51] Int. Cl.$^5$ .............................................. C22B 4/00
[52] U.S. Cl. ................................................ 75/10.35
[58] Field of Search ...................................... 75/10.35

[56] References Cited

U.S. PATENT DOCUMENTS 4,349,383  9/1982  Chaudhuri ............................ 75/640
4,419,127  12/1983  Tanson ................................ 75/10 R

*Primary Examiner*—Peter D. Rosenberg
*Attorney, Agent, or Firm*—Jerry Cohen; Harvey Kaye

[57] ABSTRACT

The metal-values bearing slags of metallothermic processes are separated from metal melts and then fully reduced electrothermally with carbon to form a new metal melt. Slag removed from the new metal melt is essentially free of said metal values.

10 Claims, No Drawings

PROCESS FOR THE RECOVERY OF VALUABLE MATERIALS FROM SLAGS OF METALLOTHERMIC PROCESSES

BACKGROUND OF THE INVENTION

This invention relates to a process for the recovery of valuable materials from slags accumulating in metallothermic processes for the production of metals or ferro alloys, in which a mixture of metal oxides, reducing agents or, additionally, metals is ignited and a metal melt and a slag melt are formed.

Metallothermic processes are metallurgical reactions between certain metal oxides, such as for example molybdenum, tungsten, vanadium, chromium or niobium oxide, with the reducing agents aluminum or silicon, the corresponding metals of the oxides (or even alloys) being formed by spontaneous (exothermic) reaction where additional oxides or metals are present during the reaction. For example, ferromolybdenum, ferrotungsten, ferrovanadium, ferrochromium and also ferroniobium or nickel niobium are produced by this method.

Slags containing varying amounts of the valuable metal oxide ($MoO_3$, $WO_3$, $Cr_2O_3$, $Nb_2O_5$, $V_2O_5$) in addition to the oxide of the reducing agent ($Al_2O_3$ and/or $SiO_2$) accumulate in all metallothermic processes. The reason for this lies in incomplete reduction reactions between metal oxide and reducing agent. This case frequently occurs in practice because the reaction cannot quite be completed if a certain content of reduction metal in the end product is not to be exceeded.

The closest prior art in this regard is represented by German Patent Application 3 215 369 which describes one such metallothermic process. This document discloses a measure for increasing the yield of the metal phase which comprises treating the still molten slags from such processes with additional reducing agents in the presence of electrothermal energy until the slag is substantially free from the valuable materials used as metal oxides. The disadvantage of this process lies in the fact that its control is made very complicated by repeated sampling and analysis of the still liquid reactants during the post-reduction phase and in the fact that maintaining the boundary conditions for the content of unwanted reduction metal in the metal phase is determined by very critical process parameters. Accordingly, a compromise has to be established between the purity of the metal phase and the residual content of metal oxides used in the slag.

Accordingly, the problem addressed by the present invention was, and its object is, to provide a process which would not be attended by the above-described disadvantages.

SUMMARY OF THE INVENTION

According to the invention the slag separated from the metal phase is worked up by a separate process based on a different reaction mechanism. Most of the valuable material, e.g. $Nb_2O_5$, is removed from the slag and is favorably utilized in the secondary products. Accordingly, it is possible by a metallothermic reduction of metal oxides of the described type by reduction metals, for example aluminium and/or silicon, to produce alloys which are substantially free from impurities attributable to the reduction metal, the valuable materials still necessarily present in the form of the oxides used in the slags formed being recovered substantially completely in the form of a product with the correct specification.

Accordingly, the present invention relates to a process for the recovery of valuable materials from slags which accumulate in metallothermic processes for the production of metals or ferro alloys, in which a mixture of metal oxides, reducing agents or, additionally, metals is ignited and a metal melt and a slag melt are formed, characterized in that the slag is separated from the metal phase and, in a following separate step, is fully reduced electrothermally with carbon to form a new metal melt.

Slags containing 5 to 11% by weight $Nb_2O_5$ normally accumulate in the production of ferro niobium or nickel niobium having a limited residual reduction metal content of at most 1% Al by weight. These slags would normally have to be discarded because, with residual contents of at most 1% Al, the niobium oxide contents of the slag cannot fall below the required levels due to the reaction. However, these valuable materials can be recovered by the process according to the invention.

In one preferred embodiment of the process according to the invention, the metal of the new metal melt is oxidized to the corresponding metal oxides to eliminate the residual carbon content.

The quantity of carbon added preferably corresponds at least to the stoichiometric quantity of the metal oxide to be reduced. In addition, positive effects can be obtained if metals and/or metal oxides are added to the separated slag.

DETAILED DESCRIPTION OF PREFERRED EMBODIMENTS

The following Example is intended to illustrate the invention without limited it in any way.

EXAMPLE

A slag accumulating in the metallothermic production of nickel niobium oxide with aluminium had the following composition: 9.2% $Nb_2O_5$, approx. 70% $Al_2O_3$, remainder CaO. The residual aluminium content in the final alloy was 0.95% by weight.

After separation from the final metal (nickel-niobium alloy), this slag was collected and size-reduced to <40 mm. In accordance with the composition of the slag, the necessary quantity of reducing agent in the form of coke breeze, certain quantities of quicklime and nickel in such a quantity that a nickel-niobium alloy containing 60% Nb would be formed as the product were then added to the slag. In one typical case the composition was:

slag: 1525 kg
coke: 66 kg
quicklime: 465 kg
nickel: 50 kg

The resulting mixture was melted under carbothermal conditions in an arc furnace with a refractory furnace vessel. The arc furnace is operated at 1400°–1600° C. and requires about 2500–3000 kWh per ton of slag employed. Up to 140 tons of slag can be treated per furnace vessel over a period of 4 days. The cooling time is 3 days. The starting materials are fed into the furnace via vibrating chutes. On completion of reduction, the slag formed was decanted off from the still liquid metal. At the end of the reduction process, the final slag was found by analysis to contain less than 0.15% $Nb_2O_5$. Accordingly, the slag was free from valuable materials and could be disposed off.

Accordingly, the metal accumulating in this melt very largely contained the valuable material to be recovered, niobium, and had the following composition: 60% Nb, 32% Ni, 3% Fe, 2% Al, 1% Si, 2% C. This alloy with impurities of Al, Si and C can be refined in another step by size reducing the metal to a grain size of less than 0.5 mm and oxidizing the granular metal in a shelved roasting furnace to remove the high residual carbon content. This is the case at reaction temperatures above 700° C. and a niobium oxide/nickel oxide mixture having the following approximate composition: 67% $Nb_2O_3$, 30% NiO, 3% ($Fe_2O_3$+$SiO_2$) is formed. This oxide mixture now contains 98 to 99% of the valuable material as end product. It may be used as a part of raw material in subsequent metallothermic processes for the production of nickel niobium.

The oxides of the elements Mo, W, Cr and V can be similarly affected for the recovery process according to the invention for the residual contents in metallothermal slags.

I claim:

1. A process for the recovery of valuable materials from slags which accumulate in exothermic metallothermic processes for the production of metals of ferro alloys, in which a mixture of metal oxides, reducing agents or, additionally, metals is ignited and a metal melt and a slag melt are formed, characterized in that (a) the slag is separated from the metal phase and (b) in a following separate step the slag with alloying additions is fully reduced electrothermally with carbon to form a new metal alloy melt.

2. A process as claimed in claim 1, comprising the steps that the metal of the new metal melt is oxidized to the corresponding metal oxide to eliminate the residual carbon content therefrom.

3. A process as claimed in claim 2, wherein the quantity of carbon added corresponds at least to the stoichiometric quantity of the metal oxide content of the slag to be reduced.

4. A process as claimed in claim 3, wherein metals and/or metal oxides are added to the separated slag.

5. A process as claimed in claim 2, wherein metals and/or metal oxides are added to the separated slag.

6. A process as claimed in claim 1, wherein metals and/or metal oxides are added to the separated slag.

7. A process as claimed in claim 1, wherein the quantity of carbon added corresponds at least to the stoichiometric quantity of the metal oxide content of the slag to be reduced.

8. A process as claimed in claim 1 wherein the new metal oxide melt is further processed to produce further metal alloy of the type initially recovered in the metal melt phase of said initial metallothermic process.

9. A process as claimed in claim 8 wherein said metal alloy is niobium-nickel.

10. A process as claimed in claim 1 wherein said metal alloy is niobium-nickel.

* * * * *